(12) United States Patent
Crow

(10) Patent No.: US 6,254,300 B1
(45) Date of Patent: Jul. 3, 2001

(54) HINGE PIN AND RETENTION SLEEVE

(75) Inventor: Stephan M. Crow, Broken Arrow, OK (US)

(73) Assignee: The Crosby Group, Inc., Tulsa, OK (US)

( * ) Notice: Subject to any disclaimer, the term of this patent is extended or adjusted under 35 U.S.C. 154(b) by 0 days.

(21) Appl. No.: 09/293,478

(22) Filed: Apr. 16, 1999

(51) Int. Cl.[7] .................................................. F16G 13/06
(52) U.S. Cl. ............................................. 403/155; 59/85
(58) Field of Search .................................... 403/155, 150, 403/375, 157, 161; 59/84, 85

(56) References Cited

U.S. PATENT DOCUMENTS

| Re. 27,620 | 4/1973 | Crook, Jr. ................................ 59/85 |
|---|---|---|
| Re. 28,746 | 3/1976 | Bruce ....................................... 59/78 |
| 373,983 | 11/1887 | Jeffrey . | |
| 2,155,584 | 4/1939 | Bryant et al. ............................. 59/8 |
| 2,972,223 | 2/1961 | Devonshire et al. .................... 59/88 |
| 3,134,221 | 5/1964 | Bergman .................................. 59/85 |
| 3,241,309 | 3/1966 | Mason ...................................... 59/85 |
| 3,373,560 | 3/1968 | Manney et al. .......................... 59/85 |
| 3,453,822 * | 7/1969 | Crook, Jr. ................................ 59/85 |
| 3,828,550 | 8/1974 | Fink ......................................... 59/85 |
| 3,899,873 | 8/1975 | Fink ......................................... 59/85 |
| 4,106,284 | 8/1978 | Crook, Jr. ................................ 59/85 |
| 4,107,917 * | 8/1978 | Fink ......................................... 59/85 |
| 4,179,878 | 12/1979 | Albertini .................................. 59/85 |
| 4,391,313 * | 7/1983 | Weidler ................................... 59/85 |

FOREIGN PATENT DOCUMENTS

| 2353911 * | 4/1966 | (DE) ........................................ 59/85 |
|---|---|---|
| 731881 * | 4/1966 | (CA) ........................................ 59/85 |
| 1234460 * | 2/1967 | (DE) ........................................ 59/85 |

* cited by examiner

*Primary Examiner*—Lynne H. Browne
*Assistant Examiner*—David E. Bochna
(74) *Attorney, Agent, or Firm*—Head, Johnson & Kachigian

(57) ABSTRACT

A hinge pin and retention sleeve to be used as part of a coupling assembly. The coupling assembly includes two chain half-links, the hinge pin, and the retention sleeve. The hinge pin has an annular notch with a reduced cross-section. The retention sleeve has a valley with a reduced cross-section. The retention sleeve fits over the hinge pin and the valley of the retention sleeve fits into and engages the hinge pin annular notch, preventing the hinge pin from moving laterally with respect to the sleeve. Ends of the sleeve nearly abut the chain half-links, with a slight gap between the ends and the chain half-links. The sleeve is restricted from substantial lateral movement by inner faces of the chain half-links. The hinge pin annular notch and the retention sleeve valley are located in the center portion of the hinge pin and retention sleeve, respectively, away from the high-stress areas near the chain half-links.

18 Claims, 4 Drawing Sheets

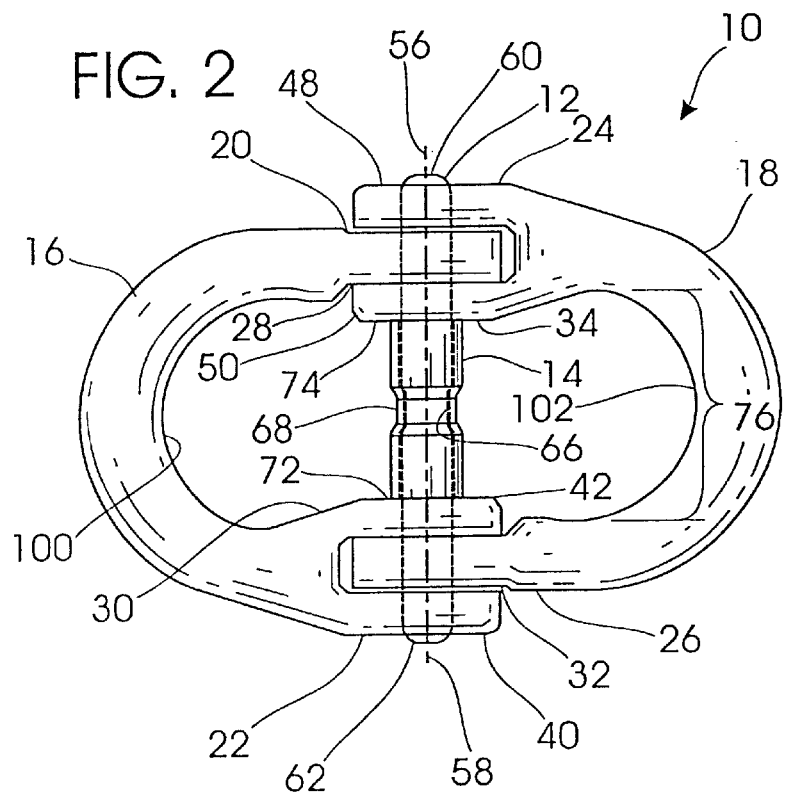

HINGE PIN AND RETENTION SLEEVE

BACKGROUND OF THE INVENTION

1. Field of the Invention.

The invention relates to hinge pins and retention sleeves used in chain link assemblies.

2. Prior Art.

The use of hinge pins to connect half-links of chains is widely known. In typical applications, the chain half-links are U-shaped with aligned passages near a top of the U-shaped half-links to receive a hinge pin. An adjoining half-link has a similar or identical geometry. When a hinge pin passes through the passages of adjacent half-links, the adjacent half-links are thereby connected together. Various methods have been used to secure the hinge pins with respect to the chain half-links, including the use of C-clamps and sleeves.

There have been many inventions for hinge pins for chain link assemblies. For example, Devonshire et al. (U.S. Pat. No. 2,972,223) discloses a joiner link assembly having a collar or sleeve to receive a joining pin 12, having circumferentially spaced and longitudinally extending flutes 35. The assembly permits the pin to be easily started into the collar bore. Manney et al. (U.S. Pat. No. 3,373,560) discloses a joiner link with a pin 26 having main diameter portions 46 and 48 and a reduced diameter portion 44. A locking clip 40 surrounds the reduced diameter portion. In one embodiment, a pair of washers surrounds the locking clip 40 on the pin.

Fink (U.S. Pat. No. 3,828,560) discloses a coupling link having a pin 30 with an annular groove 36. A spring clip 24 locks the pin 30 in an axial position.

Crook, Jr. (U.S. Pat. No. RE 27,260) discloses a coupling link having identical like halves each provided with mating ears. A coupling pin 22 of constant outside diameter is received in a longitudinally split sleeve having a lesser nominal diameter than the pin.

Bergman (U.S. Pat. No. 3,134,221) discloses a coupling with a pin 4 having a spring 9 which resides in a reduced diameter groove 7. Additional grooves 8 on each side of the groove 7 receive the spring 9 if the pin 4 is dislodged.

Mason (U.S. Pat. No. 3,241,309) discloses a joiner link assembly having a pin 22 with an enlarged knob-shaped central portion 30. C-shaped locking sleeves surround the pin on each side of the knob-shaped central portion 30.

Other patents deemed pertinent to the present invention are listed below.

| PATENTEE | U.S. PAT. NO. |
| --- | --- |
| Fink | 3,899,873 |
| Albertini | 4,179,878 |
| Crook, Jr. | 4,106,284 |

While there have been other chain link assemblies having hinge pins and retention sleeves, these assemblies have had many problems. For some existing hinge pins and sleeves, a C-shaped sleeve has been crimped onto the pin along the length of the pin, which results in eventual loosening of the sleeve.

For other hinge pins and sleeves of the existing art, for which a pin and sleeve have reduced cross-sections such as the device shown in FIG. 1, these reduced cross-sections are located near the high-force areas where the pin engages a half-link. Because the forces acting on the pin and sleeve are greater near the half-links, it is undesirable to have reduced cross-sections in these areas. The resultant stresses acting within the pin and sleeve are inversely proportional to the areas of the cross-section of the pin and sleeve. As a result, the pin and sleeve are more likely to fail.

Another problem with existing hinge pins and sleeves, they are composed of many parts which are difficult and cumbersome to assemble.

It is, therefor, a principal object and purpose of the present invention to provide a retainment device for a hinge pin to connect chain half-links together.

It is a further object and purpose of the present invention to provide a hinge pin with a retainment device to laterally position the hinge pin with respect to the chain half-links.

A still further object and purpose of the present invention is to provide a hinge pin and retainment device that are each unitary to facilitate installation of the hinge pin and sleeve in a coupling assembly.

Another object and purpose of the invention is to provide a hinge pin and retainment device in which reduced cross-sections are located near the center of the hinge pin and sleeve away from the high-stress areas near the chain half-links.

Another object and purpose of the invention is to provide a hinge pin and retainment device in which the hinge pin annular notch has a blended, transition radius to remove high stress concentrations.

Another object and purpose of the invention is to provide a retainment device that, after installation is completed, remains in an un-stressed state and therefore is not susceptible to failure modes that are associated with steel components that are subjected to continual stress.

SUMMARY OF THE INVENTION

The present invention is directed to a hinge pin and retention sleeve to be used as part of a coupling assembly. The coupling assembly includes two chain half-links, the hinge pin, and the retention sleeve. The hinge pin has an annular notch with a reduced cross-section. The retention sleeve has a corresponding valley with a reduced cross-section. The retention sleeve fits over the hinge pin and the valley of the retention sleeve fits into and engages the hinge pin annular notch, thereby preventing the hinge pin from moving laterally with respect to the sleeve. The ends of the sleeve nearly abut the chain half-links, with a slight gap between the ends and the chain half-links. The sleeve is also restricted from substantial lateral movement by inner faces of the chain half-links.

The hinge pin annular notch and the retention sleeve valley are located in the center portion of the hinge pin and retention sleeve, respectively, away from the high-stress areas near the chain half-links.

BRIEF DESCRIPTION OF THE DRAWINGS

FIG. 1 shows a detailed broken view of a hinge pin and retention sleeve of the present invention (prior art).

FIG. 2 shows an assembled side elevation view of a hinge pin and retention sleeve of the present invention coupling two half-links of a coupling assembly.

FIG. 3 shows a exploded side elevation view of two half-links.

DETAILED DESCRIPTION OF THE PREFERRED EMBODIMENTS

Figure 4:
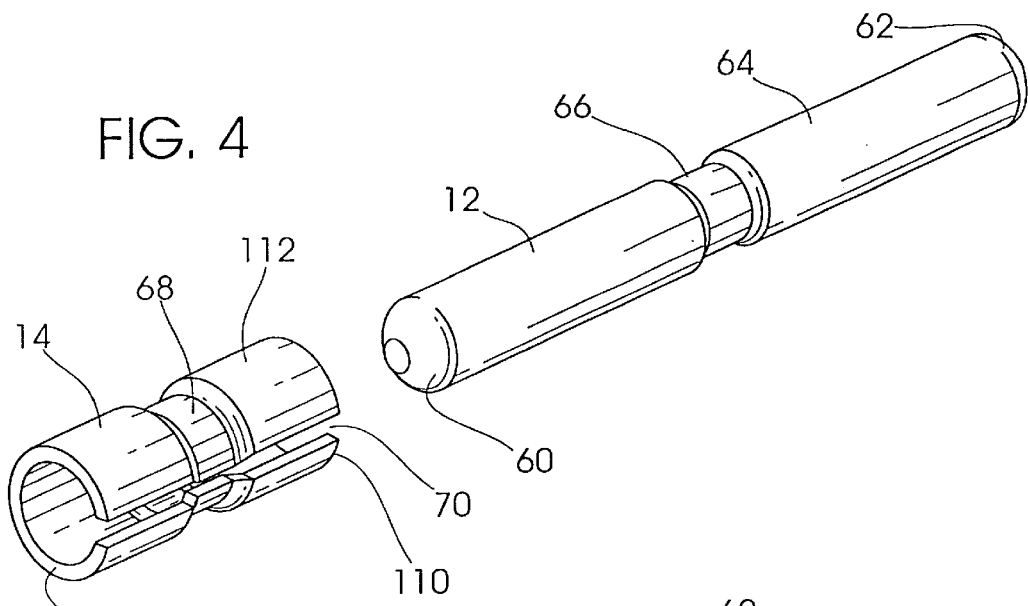
FIG. 4 shows a perspective view of a hinge pin and retention sleeve of the present invention, with the retention sleeve removed from the hinge pin.

For the embodiments described below, like numbers in a particular drawing correspond to like parts in other drawings.

Referring to the drawings in detail, FIG. 1 illustrates a prior art hinge pin having reduced diameter along the length of the sleeve.

In FIGS. 2 through 10, a coupling assembly 10 has a hinge pin 12, a retainment device in the form of a sleeve 14, a first half-link 16, and a second half-link 18. FIG. 2 shows the coupling assembly in assembled fashion. As best seen in FIG. 3, the first half-link 16 has a first head 28 at a first half-link top 20 and a first clevis 30 at a first half-link bottom 22. The second half-link 18 has a second head 32 at a second half-link bottom 26 and a second clevis 34 at second half-link top 24. The half-link heads 28 and 32 have passages 36 and 38, respectively. The first clevis 30 has passages 44 and 46 in each fork 40 and 42. The second clevis 34 has passages 52 and 54 in each fork 48 and 50. The passages 36, 44 and 46 are cylinders of the same diameter, and are aligned to share a common axis centerline 56. The passages 3S, 52 and 54 are cylinders of the same diameter, and are aligned to share a common axis centerline 58. The passages 36, 44 and 46 have the same diameters as the passages 38, 52 and 54.

As shown in FIG. 2, the hinge pin 12 is positioned in: (a) retention sleeve 14; (b) the first half-link passages 36, 44 and 46; and (c) the second half-link passages 38, 52 and 54. Retention sleeve 14 restricts lateral movement of the hinge pin 12 but allows the half-links to rotate about the pin. A retention sleeve length 88 (FIG. 7) is slightly less than a distance 76 (FIG. 3) between chain half-link inner faces 72 and 74, to prevent binding of sleeve 14 against faces 72 and 74.

Figure 5:
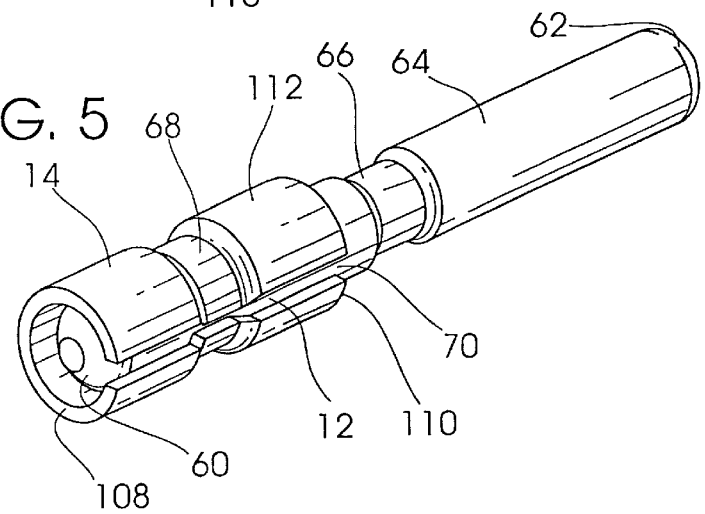
FIG. 5 shows a perspective view of a hinge pin and retention sleeve of the present invention, with the hinge pin partially inserted into the retention sleeve.
Figure 6:
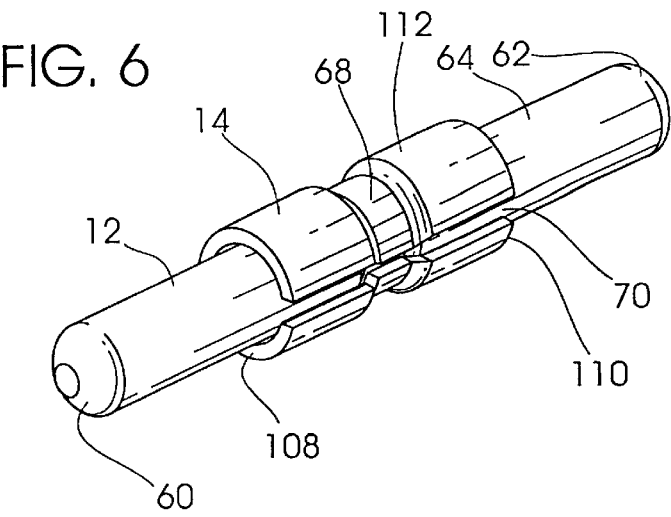
FIG. 6 shows a perspective view of a hinge pin and retention sleeve of the present invention, with the hinge pin fully inserted into the retention sleeve.
Figure 7:
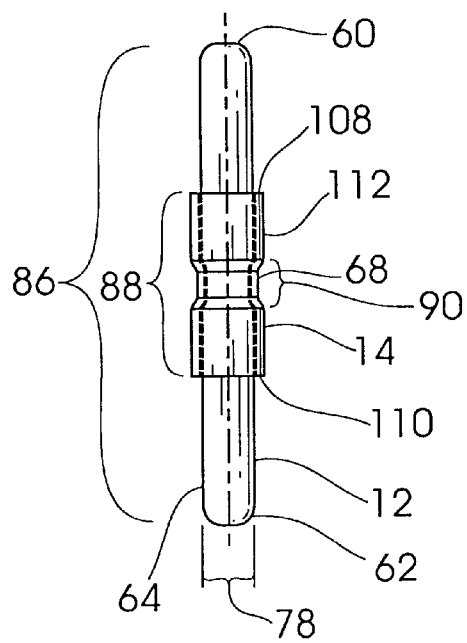
FIG. 7 shows an assembled side elevation view of a hinge pin and retention sleeve of the present invention.
Figure 8:
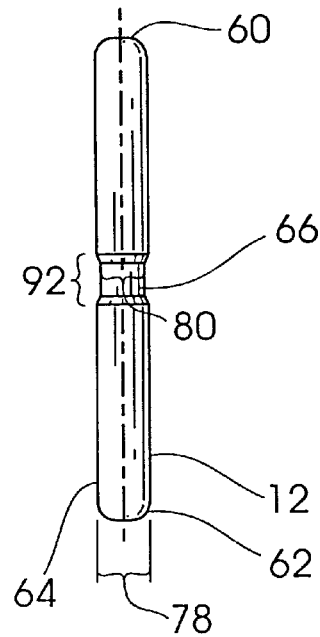
FIG. 8 shows a side elevation view of a hinge pin of the present invention.
Figure 9:
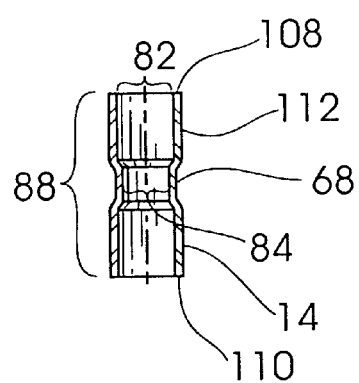
FIG. 9 shows a section view of a retention sleeve, taken along a diameter of the retention sleeve.

As best seen in FIGS. 4 through 6, the hinge pin 12 is in the shape of a cylinder with rounded ends 60 and 62. The hinge pin 12 has a barrel 64 and an annular notch 66 in a center portion of the hinge pin 12 away from the ends. The retention sleeve 14 has the shape of a C-shaped annulus, with a slot 70 running parallel to the axis. The sleeve 14 has an annular valley 68 in a center portion of the sleeve 14. As best seen in FIGS. 7 through 10, in the embodiment shown a valley length 90 is less than one-third of sleeve length 88. A notch length 92 is less than one-fifth of hinge pin length 86. It will be understood that other lengths are possible within the scope of the invention.

Figure 10:
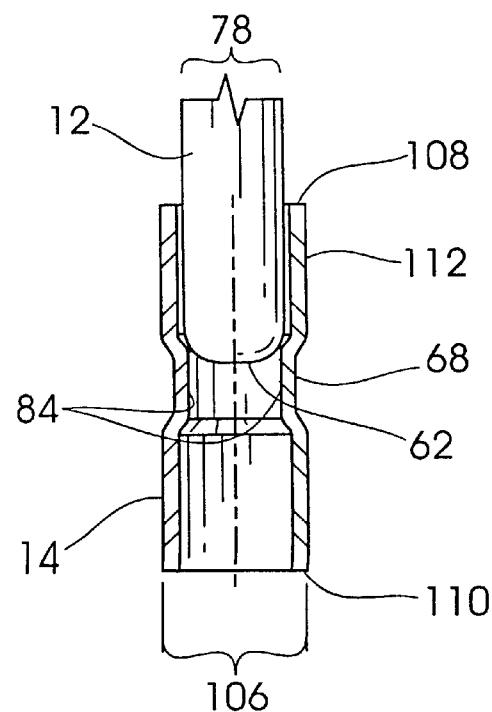
FIG. 10 shows an assembled section view of a hinge pin partially inserted into a retention sleeve, taken along a diameter of the retention sleeve.

As best seen in FIGS. 7 through 10, a barrel diameter 78 is the maximum diameter of barrel 64. A notch diameter 80 is the minimum diameter of the hinge pin 12. A major bore diameter 82 is the maximum inner diameter of the retention sleeve 14. A valley diameter 84 is the minimum inner diameter of sleeve 14. As shown in FIG. 10, the barrel diameter 78 of the pin is greater than the sleeve valley diameter 84.

The retention sleeve 14 has a major bore 82 with a diameter substantially equal to the diameters of passages 36, 44, 46, 38, 52 and 54. A diameter 106 of major sleeve outer surface 112 is greater than the major bore diameter 82. Thus, the sleeve ends 108 and 110 abut the half-link inner faces 72 and 74.

Figure 11:
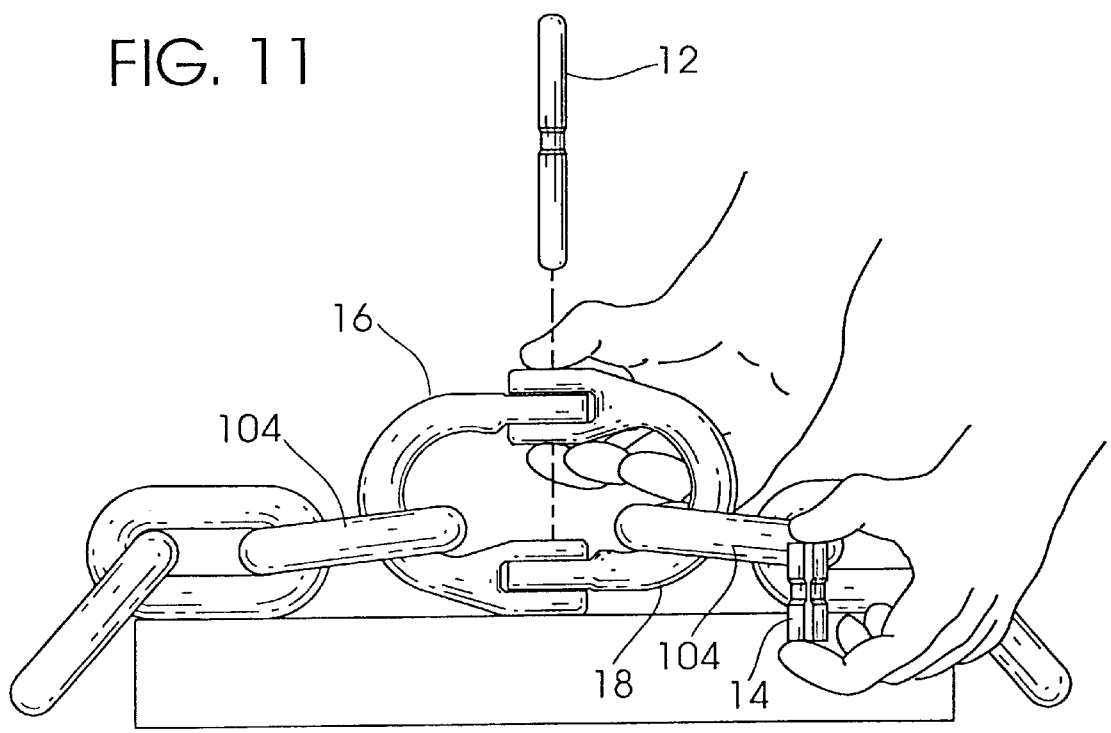
FIG. 11 shows a person aligning passages of two half-links of the coupling assembly, in preparation of installing a hinge pin and retention sleeve of the present invention.
Figure 12:
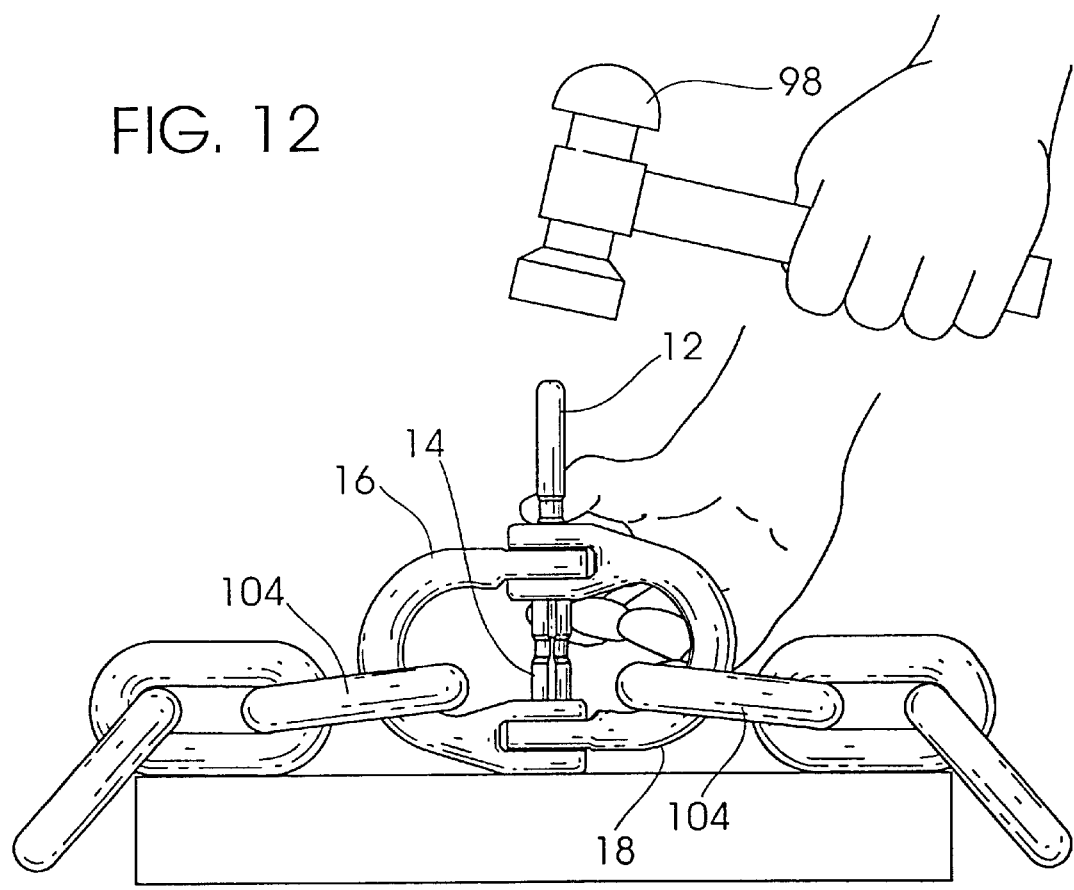
FIG. 12 shows a person installing a hinge pin in a retention sleeve for a hinge pin and retention sleeve of the present invention.

In order to install the hinge pin 12 and the retention sleeve 14, as shown in FIGS. 11 and 12, a person initially places first head 28 inside second clevis 34, aligning passages 36, 52, and 54. The person then positions the retention sleeve 14 between the half-link inner faces 72 and 74 and aligns the major bore 78 with passages 44, 38, and 46. The person then inserts the hinge pin second end 62 through passages 36, 52, and 54 and partially into the retention sleeve 14. Next, using a hammer 98, the person strikes the hinge pin first end 60, forcing hinge pin 12 into retention sleeve 14. The sleeve will spread slightly to accommodate the passage of the second end through valley 68. The person continues to strike the hinge pin first end 60 with hammer 98 until the notch 66 is seated in valley 68.

The present invention places the valley, i.e., reduced section of pin, at the center of the pin and away from the high-stress areas near the chain half-links.

Additionally, once the sleeve has been installed, the sleeve is in an unstressed state and, therefore, is not susceptible to failure modes that may be associated with steel or other metal components that are the result of being under continual stress.

The present invention has been described in relation to the drawings attached hereto, but it should be understood that other and further modifications, apart from those shown or suggested herein, may be made within the spirit and scope of this invention.

What is claimed is:

1. A coupling assembly for connecting chain half-links, each half-link having aligned cylindrical passages of equal diameter, comprising:
   (a) a cylindrical hinge pin with two ends, said hinge pin having a barrel and having an annular notch in a center portion of said hinge pin;
   (b) a retention sleeve, said retention sleeve having
      (i) a major bore,
      (ii) a major outer surface, and
      (iii) an annular valley in a center portion of said retention sleeve
   wherein said major outer surface is reduced at said annular valley and wherein an inner diameter of said annular valley is greater than a diameter of said annular notch;
   (c) said hinge pin adapted to be positioned through the aligned passages of the chain half-links, connecting the half-links together;
   (d) said retention sleeve major outer surface having a diameter larger than the diameters of the chain half-link passages; and (e) said retention sleeve disposed about said hinge pin with said annular valley positioned in said annular notch, to restrict lateral movement of said hinge pin.

2. The hinge pin and retention sleeve of claim 1 wherein said hinge pin ends are rounded.

3. The hinge pin and retention sleeve of claim 2 wherein a diameter of said hinge pin barrel is larger than a diameter of said retention sleeve valley, such that said retention sleeve valley protrudes into said hinge pin notch to restrict lateral movement of said hinge pin.

4. The hinge pin and retention sleeve of claim 1 wherein a width of said annular valley is less than one-third of a width of said retention sleeve.

5. The coupling assembly of claim 4 wherein a diameter of said hinge pin barrel is larger than a diameter of said retention sleeve valley, such that said retention sleeve valley protrudes into said hinge pin notch to restrict lateral movement of said hinge pin.

6. The hinge pin and retention sleeve of claim 1 wherein a width of said annular notch is less than one-fifth of a width of said hinge pin.

7. A coupling assembly for connecting chain half-links, each half-link having cylindrical passages of equal diameter, comprising:
   (a) a cylindrical hinge pin with two ends, said hinge pin having a barrel and having an annular notch in a center portion of said hinge pin;
   (b) a retention sleeve, said retention sleeve having a major bore, a major outer surface and having an annular valley in a center portion of said retention sleeve wherein said major outer surface is reduced at said annular valley and wherein an inner diameter of said annular valley is greater than a diameter of said annular notch;
   (c) said hinge pin adapted to be positioned through the aligned passages of the chain half-links, connecting the half-links together;
   (d) said retention sleeve having a diameter larger than the diameters of the chain half-link passages; and
   (e) said retention sleeve disposed about said hinge pin with said annular valley positioned in said annular notch, to restrict lateral movement of said hinge pin.

8. The coupling assembly of claim 7 wherein said hinge pin ends are rounded.

9. The coupling assembly of claim 7 wherein a width of said annular valley is less than one-third of a width of said retention sleeve.

10. The coupling assembly of claim 7 wherein a width of said annular notch is less than one-fifth of a width of said hinge pin.

11. A coupling assembly for connecting chains with terminal links, comprising:
   (a) two U-shaped chain half-links, each half-link having cylindrical passages of equal diameter;
   (b) said half-links adapted to be positioned such that an inner U-surface of each half-link engages one of the chain terminal links;
   (c) a cylindrical hinge pin with two ends, said hinge pin having a barrel and having an annular notch in a center portion of said hinge pin;
   (d) a retention sleeve with two ends, said retention sleeve having a major bore, having a major outer surface and having an annular valley in a center portion of said retention sleeve wherein said major outer surface is reduced at said annular valley and wherein an inner diameter of said annular valley is greater than a diameter of said annular notch;
   (e) said hinge pin positioned through said aligned passages of the chain half-links, connecting said half-links together;
   (f) said retention sleeve having a diameter larger than said diameters of the chain half-link passages; and
   (g) said retention sleeve disposed about said hinge pin with said annular valley positioned in said annular notch, to prevent lateral movement of said hinge pin.

12. The coupling assembly of claim 11 wherein said half-links each have a clevis end and a head end.

13. The coupling assembly of claim 11 wherein a width of said annular valley is less than one-third of a width of said retention sleeve.

14. The coupling assembly of claim 11 wherein a width of said annular notch is less than one-fifth of a width of said hinge pin.

15. A method for joining two links of chain having terminal links, comprising the steps of:
   (a) providing two U-shaped chain half-links, each of said half-links having cylindrical passages of equal diameter;
   (b) said half-links positioned such that an inner U-surface of each half-link engages one of the chain terminal links;
   (c) providing a retention sleeve with two ends, said retention sleeve having a major bore, having a major outer surface and having an annular valley in a center portion of said retention sleeve;
   (d) aligning said passages of said half-links; and
   (e) inserting a hinge pin having rounded ends and an annular notch through said aligned passages and said retention sleeve to connect said chain half-links and to restrict lateral movement of said hinge pin wherein said major outer surface is reduced at said annular valley and wherein an inner diameter of said annular valley is greater than a diameter of said annular notch.

16. The method as set forth in claim 15 of joining two links of chain having terminal links wherein said step of inserting said hinge pin comprises:
   (a) positioning said half-links on a solid surface such that centerlines of said passages are substantially perpendicular to said solid surface;
   (b) positioning said retention sleeve beneath passages of said chain links such that said major bore aligns with said passages;
   (c) placing said hinge pin through said passages and partially into said sleeve;
   (d) striking an end of said hinge pin until a hinge pin annular notch is seated in a retention sleeve valley.

17. The method for joining two links of chain having terminal links of claim 16 wherein a width of said annular valley is less than one-third of a width of said retention sleeve.

18. The method for joining two links of chain having terminal links of claim 16 wherein a width of said annular notch is less than one-fifth of a width of said hinge pin.

* * * * *